Figure 1:
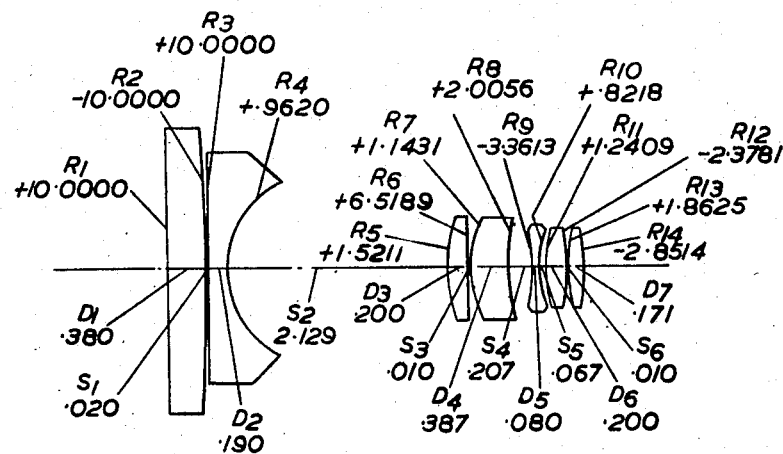

March 19, 1957 G. H. COOK 2,785,603
INVERTED TELEPHOTO OPTICAL OBJECTIVES HAVING
A DIVERGENT FRONT MEMBER WIDELY SEPARATED
FROM A CONVERGENT REAR MEMBER Filed March 29, 1954          2 Sheets-Sheet 1

Inventor
Gordon H. Cook

March 19, 1957  G. H. COOK  2,785,603
INVERTED TELEPHOTO OPTICAL OBJECTIVES HAVING
A DIVERGENT FRONT MEMBER WIDELY SEPARATED
FROM A CONVERGENT REAR MEMBER
Filed March 29, 1954  2 Sheets-Sheet 2

Inventor
Gordon H. Cook
By
Attorney

United States Patent Office 2,785,603
Patented Mar. 19, 1957

2,785,603

INVERTED TELEPHOTO OPTICAL OBJECTIVES HAVING A DIVERGENT FRONT MEMBER WIDELY SEPARATED FROM A CONVERGENT REAR MEMBER

Gordon Henry Cook, Leicester, England, assignor to Taylor, Taylor & Hobson Limited, Leicester, England, a British company Application March 29, 1954, Serial No. 419,270

Claims priority, application Great Britain August 4, 1953

26 Claims. (Cl. 88—57)

This invention relates to an optical objective, corrected for spherical and chromatic aberrations, coma, astigmatism and field curvature, and of the kind often known as an "inverted telephoto" objective, that is one in which the back focal distance is greater than the equivalent focal length of the objective, the objective consisting of a divergent front member widely separated from a convergent rear member. It should be made clear that the terms "front" and "rear" as used herein relate to the sides of the objective respectively nearer to and further from the longer conjugate, in accordance with the usual convention.

Such objectives hitherto have tended to suffer rather badly from the zonal aberrations and distortion.

The present invention has for its object to provide an inverted telephoto objective having improved correction for zonal aberrations and distortion, and corrected for wide relative aperture and giving reasonable freedom from vignetting over a wide angular field both for short focal lengths and for the longer focal lengths. A further object is to provide improved corrections for higher order astigmatism and field curvature in order to achieve a higher standard of performance towards the edges of the angular field or to permit an increased angular field.

In the inverted telephoto objective according to the present invention, the convergent rear member comprises five components of which the middle one is divergent and the other four convergent, the two outer air spaces in such member being collective and the two inner air spaces dispersive, the sum of the powers of the bounding surfaces of the front outer air space being numerically between $.4/f_2$ and $1.5f_2$, that of the front inner air space between $.5/f_2$ and $2/f_2$, that of the rear inner air space between $.25/f_2$ and $1/f_2$, and that of the rear outer air space between $.5/f_2$ and $1.5/f_2$, whilst the sum of the powers of the surfaces of the two rear components is greater than $1.25/f_2$, the power of each of such four surfaces being less than $.75/f_2$, where $f_2$ is the equivalent focal length of the convergent rear member. It should be made clear that the term "power," as used in the foregoing definition and applied to the bounding surface of an air space, is to be understood as meaning the difference of the mean refractive indicies of the glass and air on the two sides of such bounding surface divided by the radius of curvature of the surface, such radius for this purpose being regarded as positive if the surface is convex to the adjacent air space and negative if it is concave thereto.

Preferably, the convergent second component of the rear member is of meniscus form with its air-exposed surfaces convex to the front and the divergent middle component thereof is biconcave, whilst the two convergent rear components are each biconvex, the front surface of the front component of the rear member being convex to the front. The radius of curvature of the rear surface of the divergent third component of the rear member is preferably less than 0.8 times that of the front surface of the convergent fourth component of such member and greater than $0.4f_2$, where $f_2$ is the equivalent focal length of the rear member, the axial air separation between such third and fourth components being less than $0.1f_2$. Conveniently, the overall axial length of the rear member lies between $.75f_2$ and $1.2f_2$.

The five components of the rear member may all be simple, or alternatively the second component of the rear member may be compound with its internal contact surface collective and convex to the front with radius of curvature less than $.7f_2$ and greater than half the diameter of the rear element of the component, the other four components of the rear member all being simple.

The divergent front member may be arranged in various ways. In one arrangement, the front member consists of a biconvex convergent simple component in front of a meniscus divergent simple component having its surfaces convex to the front. Conveniently, the radii of curvature of the front three surfaces of the front member are each greater than $f_1$, the equivalent focal length of the front member, and the radius of curvature of the rear surface of such member lies between $.25f_1$ and $.5f_1$, the axial air separation between the two components of the front member being less than $0.1f_1$.

In another arrangement, the divergent front member consist of two components, of which at least one is divergent and at least one is compounded of two elements, the mean refractive index of the material of the front element exceeding that of the rear element by at least 0.1, the air-exposed surfaces of these two components all being convex to the front. The radius of curvature of the rear surface of the front component of the front member preferably lies between .3 and .75 times that of the front surface of the rear component of such member. The radius of curvature of the front surface of the front component of the front member is preferably greater than that of the rear surface of such component and less than $3f_1$, the radius of curvature of the rear surface of the rear component being less than that of the front surface of the front component of such member and greater than $.25f_1$. The axial separation between the two components of the front member should preferably be made as small as possible, the limit being set by edge contact at the diameter required by the angular beam. Such separation should not be greater than $.25f_1$.

Figure 2:
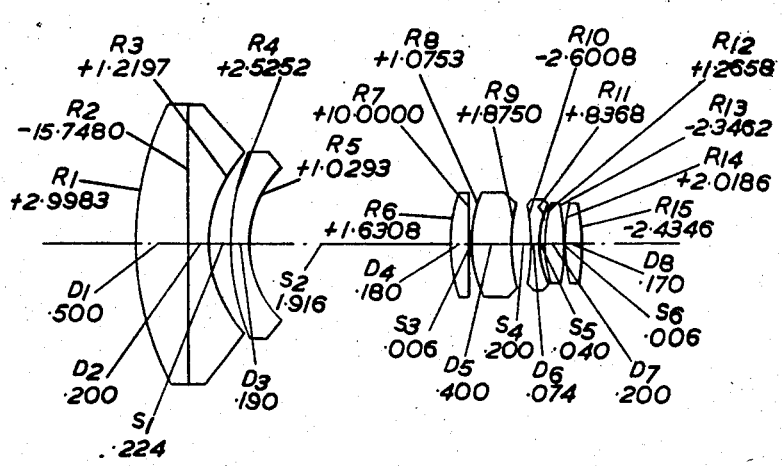
Figure 3:
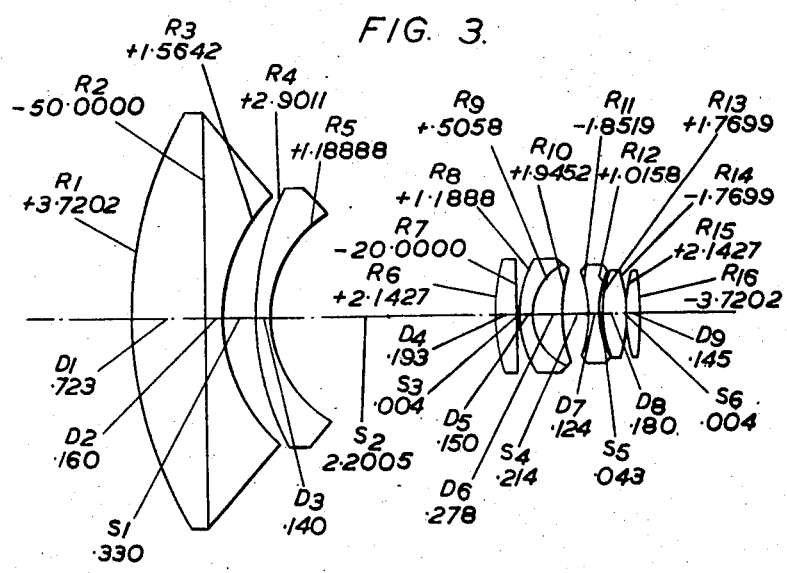
Figure 4:
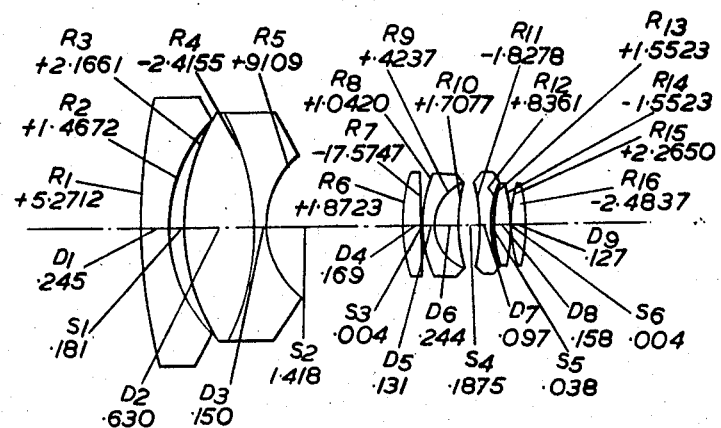

Figures 1–4 of the accompanying drawings respectively illustrate four alternative constructions of inverted telephoto objective according to the invention.

Numerical data for convenient practical examples of such constructions are given in the following tables, in which $R_1R_2$ . . . represent the radii of curvature of the surfaces of the objective, the positive sign indicating that the surface is convex to the front and the negative sign that it is concave thereto, $D_1D_2$ . . . represent the axial thicknesses of the individual elements, and $S_1S_2$ . . . represent the axial air separations between the components. The tables also give the mean refractive index $n_d$ for the $d$-line and the Abbé V number for the material used for the various elements.

The insertion of equals (=) signs in the radius columns of the tables, in company with plus (+) and minus (−) signs which indicate whether the surface is convex or concave to the front, is for conformity with the usual Patent Office custom, and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radius indicated for example as positive in the tables may have to be treated as negative for some calculations as is well understood in the art.

Example I

[Equivalent focal length 1.000. F/1.75.]   Relative aperture

| Radius | Thickness or Air Separation | Refractive Index $n_d$ | Abbé V Number |
|---|---|---|---|
| $R_1 = +10.0000$ | $D_1 = .380$ | 1.7169 | 29.4 |
| $R_2 = -10.0000$ | $S_1 = .020$ | | |
| $R_3 = +10.0000$ | $D_2 = .190$ | 1.5304 | 52.0 |
| $R_4 = + .9620$ | $S_2 = 2.129$ | | |
| $R_5 = + 1.5211$ | $D_3 = .200$ | 1.6134 | 59.3 |
| $R_6 = + 6.5189$ | $S_3 = .010$ | | |
| $R_7 = + 1.1431$ | $D_4 = .387$ | 1.6510 | 58.6 |
| $R_8 = + 2.0056$ | $S_4 = .207$ | | |
| $R_9 = - 3.3613$ | $D_5 = .080$ | 1.7169 | 29.4 |
| $R_{10} = + .8218$ | $S_5 = .067$ | | |
| $R_{11} = + 1.2409$ | $D_6 = .200$ | 1.6134 | 59.3 |
| $R_{12} = - 2.3781$ | $S_6 = .010$ | | |
| $R_{13} = + 1.8625$ | $D_7 = .171$ | 1.6510 | 58.6 |
| $R_{14} = - 2.8514$ | | | |

In this example the back focal length is 1.173F, where F is the equivalent focal length of the objective. The divergent front member has equivalent focal length $f_1$ equal to 3.0F and relative aperture $f_1/1.1$. The convergent rear member has equivalent focal length $f_2$ equal to 1.4F and relative aperture $f_2/1.4$. The distance between the adjacent nodal planes of the two members is 2.6F. The diaphragm is located between the surfaces $R_8$ and $R_9$. This example is corrected for a semi-angular field of 27½ degrees.

The diameter of the front component of the front member is 2.735F, and that of the rear component of the front member 2.280F, the chamfer diameter of the rear surface of such rear component being 1.635F. The diameters of the front two components of the rear member are 1.000F and those of the rear two components of such member are .750F, the chamfer diameters of the two surfaces of the middle component of the rear member also being .750F.

The overall axial length of the rear member is 1.332F or .95$f_2$.

Example II

[Equivalent focal length 1.000. F/1.75.]   Relative aperture

| Radius | Thickness or Air Separation | Refractive Index $n_d$ | Abbé V Number |
|---|---|---|---|
| $R_1 = + 2.9983$ | $D_1 = .500$ | 1.74400 | 44.7 |
| $R_2 = -15.7480$ | $D_2 = .200$ | 1.50759 | 61.2 |
| $R_3 = + 1.2197$ | $S_1 = .224$ | | |
| $R_4 = + 2.5252$ | $D_3 = .190$ | 1.54769 | 45.6 |
| $R_5 = + 1.0293$ | $S_2 = 1.916$ | | |
| $R_6 = + 1.6308$ | $D_4 = .180$ | 1.65100 | 58.6 |
| $R_7 = +10.0000$ | $S_3 = .006$ | | |
| $R_8 = + 1.0753$ | $D_5 = .400$ | 1.65100 | 58.6 |
| $R_9 = + 1.8730$ | $S_4 = .200$ | | |
| $R_{10} = - 2.6008$ | $D_6 = .074$ | 1.71688 | 29.4 |
| $R_{11} = + .8368$ | $S_5 = .040$ | | |
| $R_{12} = + 1.2658$ | $D_7 = .200$ | 1.65100 | 58.6 |
| $R_{13} = - 2.3462$ | $S_6 = .006$ | | |
| $R_{14} = + 2.0186$ | $D_8 = .170$ | 1.65100 | 58.6 |
| $R_{15} = - 2.4346$ | | | |

In this example the back focal length is 1.162F, where F is the equivalent focal length of the objective. The divergent front member consists of a divergent doublet in front of a divergent simple component, and has equivalent focal length $f_1$ equal to 2.54F and relative aperture $f_1/0.93$. The convergent rear member has its five components all simple and has equivalent focal length $f_2$ equal to 1.34F and relative aperture $f_2/1.34$. The distance between the adjacent nodal planes of the two members is 2.6F. The diaphragm is located between the surfaces $R_9$ and $R_{10}$. The overall axial length of the rear member is 1.276F or .92$f_2$. This example is corrected for a semi-angular field of 27½ degrees.

The diameter of the front component of the front member is 2.73F, the chamfer diameter of the rear surface of such component being 1.80F. The diameter of the rear component of the front member is 1.90F, the chamfer diameter of the rear surface of such component being 1.50F. The diameters of the front two components of the rear member are 1.00F, the chamfer diameter of the rear surface of the second component being .82F. The diameters of the rear two components of the rear member and also the chamfer diameters of the front and rear surfaces of the divergent middle component of the rear member are .76F.

Example III

[Equivalent focal length 1.000. F/1.7.]   Relative aperture

| Radius | Thickness or Air Separation | Refractive Index $n_d$ | Abbé V Number |
|---|---|---|---|
| $R_1 = + 3.7202$ | $D_1 = .723$ | 1.74400 | 44.7 |
| $R_2 = -50.0000$ | $D_2 = .160$ | 1.50759 | 61.2 |
| $R_3 = + 1.5642$ | $S_1 = .330$ | | |
| $R_4 = + 2.9011$ | $D_3 = .140$ | 1.69100 | 54.8 |
| $R_5 = + 1.1888$ | $S_2 = 2.2005$ | | |
| $R_6 = + 2.1427$ | $D_4 = .193$ | 1.69100 | 54.8 |
| $R_7 = -20.0642$ | $S_3 = .004$ | | |
| $R_8 = + 1.1888$ | $D_5 = .150$ | 1.61470 | 55.5 |
| $R_9 = + .5058$ | $D_6 = .278$ | 1.65100 | 58.6 |
| $R_{10} = + 1.9452$ | $S_4 = .214$ | | |
| $R_{11} = - 1.8519$ | $D_7 = .124$ | 1.71688 | 29.4 |
| $R_{12} = + 1.0158$ | $S_5 = .043$ | | |
| $R_{13} = + 1.7699$ | $D_8 = .180$ | 1.65100 | 58.6 |
| $R_{14} = - 1.7699$ | $S_6 = .004$ | | |
| $R_{15} = + 2.1427$ | $D_9 = .145$ | 1.69100 | 54.8 |
| $R_{16} = - 3.7202$ | | | |

In this example the back focal length is 1.225F, where F is the equivalent focal length of the objective. The divergent front member again consists of a divergent doublet in front of a divergent simple component, this member having equivalent focal length $f_1$, equal to 2.52F and relative aperture $f_1/0.63$. The convergent rear member in this case has its second component in the form of a doublet and its remaining four components all simple, this member having equivalent focal length $f_2$ equal to 1.42F and relative aperture $f_2/1.3$. The distance between the adjacent nodal planes of the two members is 2.48F. The diaphragm is located between the surfaces $R_{10}$ and $R_{11}$. The overall axial length of the rear member is 1.335F or .94$f_2$. This example is corrected for a semi-angular field of 37 degrees.

The diameter of the front component of the front member is 4.0F, the chamfer diameter of the rear surface of such component being 2.44F. The diameter of the rear component of the front member is 2.54F, the chamfer diameter of its rear surface being 1.95F. The diameters of the front two components of the rear member are 1.10F, the chamfer diameter of the rear surface of the second component being .90F. The chamfer diameters of the front and rear surfaces of the divergent middle component of the rear member and the diameters of the rear two components of such member are .82F.

Although in these examples the internal contact surface in the front member is located in the front component of this member, this is not essential to the invention, nor is it essential that one only of the components in the front member should be compound. Thus, for instance, the following example has an internal contact surface in the rear component of the front member.

*Example IV*

[Equivalent focal length 1.000.  Relative aperture F/1.7.]

| Radius | Thickness or Air Separation | Refractive Index $n_d$ | Abbé V Number |
|---|---|---|---|
| $R_1 = + 5.2712$ | | | |
| | $D_1 = .245$ | 1.60483 | 43.8 |
| $R_2 = + 1.4672$ | | | |
| | $S_1 = .181$ | | |
| $R_3 = + 2.1661$ | | | |
| | $D_2 = .630$ | 1.74400 | 44.7 |
| $R_4 = - 2.4155$ | | | |
| | $D_3 = .150$ | 1.51507 | 56.4 |
| $R_5 = + .9109$ | | | |
| | $S_2 = 1.418$ | | |
| $R_6 = + 1.8723$ | | | |
| | $D_4 = .169$ | 1.69100 | 54.8 |
| $R_7 = -17.5747$ | | | |
| | $S_3 = .004$ | | |
| $R_8 = + 1.0420$ | | | |
| | $D_5 = .131$ | 1.61470 | 55.5 |
| $R_9 = + .4237$ | | | |
| | $D_6 = .244$ | 1.65100 | 58.6 |
| $R_{10} = + 1.7077$ | | | |
| | $S_4 = .1875$ | | |
| $R_{11} = - 1.8278$ | | | |
| | $D_7 = .097$ | 1.71688 | 29.4 |
| $R_{12} = + .8361$ | | | |
| | $S_5 = .038$ | | |
| $R_{13} = + 1.5523$ | | | |
| | $D_8 = .158$ | 1.65100 | 58.6 |
| $R_{14} = - 1.5523$ | | | |
| | $S_6 = .004$ | | |
| $R_{15} = + 2.2650$ | | | |
| | $D_9 = .127$ | 1.69100 | 54.8 |
| $R_{16} = - 2.4837$ | | | |

In this example the back focal length is 1.076F, where F is the equivalent focal length of the whole objective. The divergent front member consists of a divergent simple component in front of a divergent doublet, this front member having equivalent focal length $f_1$ equal to 2.49F, and relative aperture $f_1/0.96$. The convergent rear member, as in the previous example, has its second component in the form of a doublet and its other four components simple, this rear member having equivalent focal length $f_2$ equal to 1.24F and relative aperture $f_2/1.24$. The distance between the adjacent nodal planes of the two members is 1.84F. The diaphragm is located between the surfaces $R_{10}$ and $R_{11}$. The overall axial length of the rear member is 1.1595F or $.94f_2$. This example is corrected for a semi-angular field of 28 degrees.

The diameter of the front component of the front member is 2.60F, the chamfer diameter of its rear surface being 2.10F. The diameter of the rear component of the front member is 2.20F, its rear surface having chamfer diameter 1.40F. The diameters of the front two components of the rear member are 1.00F, the chamfer diameter of the rear surface of the second component being .80F. The chamfer diameters of the two surfaces of the divergent middle component of the rear member and the diameters of the rear two components of such member are .80F.

What I claim as my invention and desire to secure by Letters Patent is:

1. An optical objective of the inverted telephoto type, corrected for spherical and chromatic aberrations, coma, astigmatism and field curvature, and comprising a divergent front member, and a convergent rear member widely separated from the front member and consisting of five components of which the middle one is divergent and the other four convergent, the two outer air spaces in the rear member being collective, whilst the two inner air spaces in such member are dispersive, the sum of the powers of the bounding surfaces of the front outer air space being numerically between $.4/f_2$ and $1.5/f_2$, that of the front inner air space between $.5/f_2$ and $2/f_2$, that of the rear inner air space between $.25/f_2$ and $1/f_2$, and that of the rear outer air space between $.5/f_2$ and $1.5/f_2$, whilst the sum of the powers of the surfaces of the two rear components is greater than $1.25/f_2$, the power of each of such four surfaces being less than $.75/f_2$, where $f_2$ is the equivalent focal length of the convergent rear member, the equivalent focal length of the divergent front member lying numerically between 1.5 and 3.25 times the equivalent focal length of the complete objective, whilst the rear surface of such divergent front member is convex to the front and has radius of curvature lying between .33 and .83 times the axial distance between the rear nodal plane of the front member and the front nodal plane of the member.

2. An optical objective as claimed in claim 1, in which the convergent second component of the rear member is of meniscus form with its air-exposed surfaces convex to the front and the divergent middle component thereof is biconcave, whilst the two rear convergent components are each biconvex, the front surface of the front component of the rear member being convex to the front.

3. An optical objective as claimed in claim 2, in which the rear surface of the divergent third component of the rear member is convex to the front and has radius of curvature less than 0.8 times that of the front surface of the convergent fourth component, also convex to the front, and greater than $0.4f_2$, where $f_2$ is the equivalent focal length of the rear member, the axial air separation between such third and fourth components being less than $0.1f_2$.

4. An optical objective as claimed in claim 2, in which the overall axial length of the rear member lies between $.75f_2$ and $1.2f_2$, where $f_2$ is the equivalent focal length of the rear member.

5. An optical objective as claimed in claim 2, in which the second component in the rear member is compound and has its internal contact surface collective and convex to the front with radius of curvature less than $.7f_2$, where $f_2$ is the equivalent focal length of the rear member, and greater than half the diameter of the rear element of the component, whilst the other four components of the rear member are all simple.

6. An optical objective as claimed in claim 2, in which the five components of the rear member are all simple.

7. An optical objective as claimed in claim 1, in which the rear surface of the divergent third component of the rear member is convex to the front and has radius of curvature less than 0.8 times that of the front surface of the convergent fourth component, also convex to the front, and greater than $0.4 f_2$, where $f_2$ is the equivalent focal length of the rear member, the axial air separation between such third and fourth components being less than $0.1f_2$.

8. An optical objective as claimed in claim 7, in which the second component in the rear member is compound and has its internal contact surface collective and convex to the front with radius of curvature less than $.7f_2$, where $f_2$ is the equivalent focal length of the rear member, and greater than half the diameter of the rear element of the component, whilst the other four components of the rear member are all simple.

9. An optical objective as claimed in claim 1, in which the overall axial length of the rear member lies between $.75f_2$ and $1.2f_2$, where $f_2$ is the equivalent focal length of the rear member.

10. An optical objective as claimed in claim 1, in which the second component in the rear member is compound and has its internal contact surface collective and convex to the front with radius of curvature less than $.7f_2$, where $f_2$ is the equivalent focal length of the rear member, and greater than half the diameter of the rear element of the component, whilst the other four components of the rear member are all simple.

11. An optical objective as claimed in claim 1, in which the five components of the rear member are all simple.

12. An optical objective as claimed in claim 1, in which the divergent front member consists of a biconvex convergent simple component in front of a meniscus divergent simple component having its surface convex to the front.

13. An optical objective as claimed in claim 12, in which the radii of curvature of the three front surfaces of the front member are each greater than $f_1$ the equivalent focal length of such member, and the radius of curvature of the rear surface of the front member lies between $.25f_1$ and $.5f_1$, the axial air separation between the two components of the front member being less than $0.1f_1$.

14. An optical objective as claimed in claim 12, in which the convergent second component of the rear member is of meniscus form with its air-exposed surfaces convex to the front and the divergent middle component thereof is biconcave, whilst the two rear convergent components are each biconvex, the front surface of the front component of the rear member being convex to the front.

15. An optical objective as claimed in claim 12, in which the rear surface of the divergent third component of the rear member is convex to the front and has radius of curvature less than 0.8 times that of the front surface of the convergent fourth component, also convex to the front, and greater than $0.4f_2$, where $f_2$ is the equivalent focal length of the rear member, the axial air separation between such third and fourth components being less than $0.1f_2$.

16. An optical objective as claimed in claim 12, in which the five components of the rear member are all simple.

17. An optical objective of the inverted telephoto type, corrected for spherical and chromatic aberrations, coma, astigmatism and field curvature, and comprising a divergent front member, and a convergent rear member widely separated from the front member and consisting of five components of which the middle one is divergent and the other four convergent, the two outer air spaces in the rear member being collective, whilst the two inner air spaces in such member are dispersive, the sum of the powers of the bounding surfaces of the front outer air space being numerically between $.4/f_2$ and $1.5/f_2$, that of the front inner air space between $.5/f_2$ and $2/f_2$, that of the rear inner air space between $.25/f_2$ and $1/f_2$, and that of the rear outer air space between $.5/f_2$ and $1.5/f_2$, whilst the sum of the powers of the surfaces of the two rear components is greater than $1.25/f_2$, the power of each of such four surfaces being less than $.75/f_2$, where $f_2$ is the equivalent focal length of the convergent rear member the divergent front member consisting of two components, of which at least one is divergent and at least one is compounded of two elements, of which the material of the front element has mean refractive index exceeding that of the rear element by at least 0.1, the air-exposed surfaces of the two components of the front member all being convex to the front, the equivalent focal length of the divergent front member lying numerically between 1.5 and 3.25 times the equivalent focal length of the complete objective, whilst the rear surface of such divergent front member is convex to the front and has radius of curvature lying between .33 and .83 times the axial distance between the rear nodal plane of the front member and the front nodal plane of the rear member.

18. An optical objective as claimed in claim 17, in which the radius of curvature of the rear surface of the front component of the front member lies between .3 and .75 times that of the front surface of the rear component of such member.

19. An optical objective as claimed in claim 18, in which the radius of curvature of the front surface of the front component of the front member is greater than that of the rear surface of such component and is less than $3f_1$, where $f_1$ is the equivalent focal length of the front member, and the radius of curvature of the rear surface of the rear component of the front member is less than that of the rear surface of the front component of such member and is greater than $.25f_1$.

20. An optical objective as claimed in claim 18, in which the convergent second component of the rear member is of meniscus form with its air-exposed surfaces convex to the front and the divergent middle component thereof is biconcave, whilst the two rear convergent components are each biconvex, the front surface of the front component of the rear member being convex to the front.

21. An optical objective as claimed in claim 18, in which the second component in the rear member is compound and has its internal contact surface collective and convex to the front with radius of curvature less than $.7f_2$, where $f_2$ is the equivalent focal length of the rear member, and greater than half the diameter of the rear element of the component, whilst the other four components of the rear member are all simple.

22. An optical objective as claimed in claim 17, in which the radius of curvature of the front surface of the front component of the front member is greater than that of the rear surface of such component and is less than $3f_1$, where $f_1$ is the equivalent focal length of the front member, and the radius of curvature of the rear surface of the rear component of the front member is less than that of the rear surface of the front component of such member and is greater than $.25f_1$.

23. An optical objective as claimed in claim 17, in which the second component in the rear member is compound and has its internal contact surface collective and convex to the front with radius of curvature less than $.7f_2$, where $f_2$ is the equivalent focal length of the rear member, and greater than half the diameter of the rear element of the component, whilst the other four components of the rear member are all simple.

24. An optical objective as claimed in claim 17, in which the five components of the rear member are all simple.

25. An optical objective as claimed in claim 17, in which the convergent second component of the rear member is of meniscus form with its air-exposed surfaces convex to the front and the divergent middle component thereof is biconcave, whilst the two rear convergent components are each biconvex, the front surface of the front component of the rear member being convex to the front.

26. An optical objective as claimed in claim 17, in which the rear surface of the divergent third component of the rear member is convex to the front and has radius of curvature less than 0.8 times that of the front surface of the convergent fourth component, also convex to the front, and greater than $0.4f_2$, where $f_2$ is the equivalent focal length of the rear member, the axial air separation between such third and fourth components being less than $0.1f_2$.

(References on following page)

References Cited in the file of this patent

UNITED STATES PATENTS

| | | |
|---|---|---|
| 1,085,868 | Konig | Feb. 3, 1914 |
| 1,839,011 | Bielicke | Dec. 29, 1931 |
| 1,955,590 | Lee | Apr. 17, 1934 |
| 2,507,164 | Kingslake | May 9, 1950 |
| 2,548,569 | Tolle | Apr. 10, 1951 |
| 2,586,866 | Schade | Feb. 26, 1952 |
| 2,594,021 | Hopkins et al. | Apr. 22, 1952 |
| 2,629,285 | Baker | Feb. 24, 1953 |
| 2,649,022 | Angenieux | Aug. 18, 1953 |

FOREIGN PATENTS

| | | |
|---|---|---|
| 572,086 | Great Britain | Sept. 21, 1945 |